(12) United States Patent
Horikawa et al.

(10) Patent No.: US 7,493,848 B2
(45) Date of Patent: Feb. 24, 2009

(54) MAGNET TYPE RODLESS CYLINDER

(75) Inventors: Akiyoshi Horikawa, Tokyo (JP); Naoki Minowa, Tokyo (JP); Hiroshi Yoshida, Tokyo (JP); Mitsuo Noda, Ichinomiya (JP); Tsuyoshi Yonezawa, Inazawa (JP)

(73) Assignees: Howa Machinery, Ltd., Kiyosu (JP); Koganei Corporation, Tokyo (JP)

( * ) Notice: Subject to any disclaimer, the term of this patent is extended or adjusted under 35 U.S.C. 154(b) by 0 days.

(21) Appl. No.: 11/373,334

(22) Filed: Mar. 13, 2006

(65) Prior Publication Data
US 2006/0207422 A1 Sep. 21, 2006

(30) Foreign Application Priority Data
Mar. 17, 2005 (JP) ............... 2005-078000

(51) Int. Cl.
*F01B 11/02* (2006.01)
*F01B 29/00* (2006.01)
(52) U.S. Cl. .......................... 92/88; 92/85 R
(58) Field of Classification Search ............... 92/85 R, 92/88, 169.1
See application file for complete search history.

(56) References Cited

U.S. PATENT DOCUMENTS

| | | | | |
|---|---|---|---|---|
| 4,488,477 A | * | 12/1984 | Miyamoto | .............. 92/85 R |
| 6,092,456 A | * | 7/2000 | Noda et al. | .............. 92/88 |
| 6,098,521 A | * | 8/2000 | Iida | .............. 92/88 |
| 6,148,714 A | * | 11/2000 | Abe et al. | .............. 92/88 |
| 6,550,369 B2 | * | 4/2003 | Sato et al. | .............. 92/128 |
| 6,581,508 B2 | * | 6/2003 | Kudo et al. | .............. 92/85 R |

FOREIGN PATENT DOCUMENTS

| | | |
|---|---|---|
| JP | 7-28403 | 6/1995 |
| JP | 10-318210 | 12/1998 |
| JP | 11-13712 | 1/1999 |

* cited by examiner

*Primary Examiner*—Michael Leslie
(74) *Attorney, Agent, or Firm*—Finnegan, Henderson, Farabow, Garrett & Dunner, L.L.P.

(57) ABSTRACT

A magnet type rodless cylinder provided with a slide magnetically coupled with a piston arranged in a cylinder tube and a slide able to move outside of the cylinder tube. The slide has a connection mount detachably attached to it. When attaching the connection mount, the position where the connection mount and an end cap strike/contact becomes the striking/contacting position of the piston. When using a rodless cylinder without a connection mount, the distance between the slide and an end cap when the piston is positioned at the striking/contacting position becomes longer than the striking/contacting distance due to the removal of the connection mount. Therefore, external dampers able to strike/contact the slide are detachably attached to the end caps at the slide sides. Due to this, regardless of the use or nonuse of a connection mount, the piston and slide can always stop at the striking/contacting position.

14 Claims, 9 Drawing Sheets

MAGNET TYPE RODLESS CYLINDER

BACKGROUND OF THE INVENTION

1. Field of the Invention

The present invention relates to a magnet type rodless cylinder of a type comprised of a piston arranged movably in the tube axial direction in a cylinder bore formed in a cylinder tube and a slide arranged movably in the tube axial direction at the outer circumference of the cylinder tube and magnetically coupling the piston and the slide, more particularly relates to a magnet type rodless cylinder wherein end caps connected at the two ends of the cylinder tube or the slide arranged at the outside of the cylinder are provided with external dampers.

2. Description of the Related Art

In the past, there has been known a slit type rodless cylinder of the type where a piston body and a slide arranged at the outside of the cylinder are connected integrally through a slit provided in the cylinder in the axial direction. In a slit type rodless cylinder, it is known that when the end caps connected to the two ends of the cylinder tube and the piston collide when the piston moves to the cylinder ends, the shock etc. are absorbed by attachment of various types of dampers at the end caps. As a slit type rodless cylinder provided with such dampers, there are the ones disclosed in for example Japanese Unexamined Patent Publication No. 10-318210 or Japanese Unexamined Patent Publication No. 11-13712.

On the other hand, as the rodless cylinder, as disclosed in for example Japanese Unexamined Utility Model Publication No. 7-28403, there is known a magnet type rodless cylinder magnetically coupling a piston housed in a cylinder tube and a slide arranged at the outside of the cylinder tube utilizing magnets.

Figure 8:
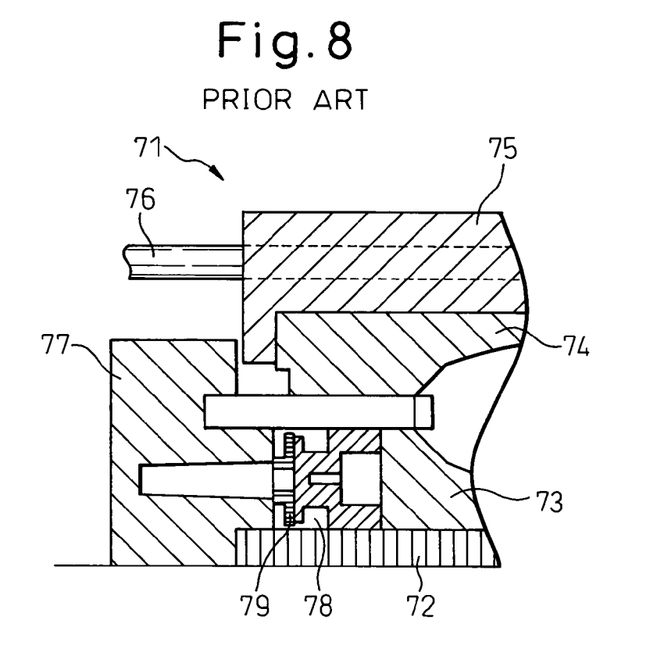
FIG. 8 and FIG. 9 are a partial sectional view and partial view for explaining the configuration of a conventional slit type rodless cylinder.

Here, the configuration of dampers of the slit type rodless cylinder disclosed in Japanese Unexamined Patent Publication No. 10-318210 will be explained with reference to FIG. 8. FIG. 8 is a partial cross-sectional view of a slit type rodless cylinder 71. The slit type rodless cylinder 71 is configured by a cylinder tube 72 provided with a not shown slit and in which a piston 73 is arranged movably in the axial direction of the cylinder tube 72. Part of the piston 73 is extended through the slit to the outside of the cylinder tube 72. This extended part is formed as a slide 74 at the outside of the cylinder tube 72. At the top surface of the slide 74 is attached a connection mount 75 guided by a guide rail 76. A workpiece etc. is placed on the connection mount 75.

Further, end caps 77 are connected to the two ends of the cylinder tube 72 (in FIG. 8, only the left end shown). Between the end caps 77 and piston 73, cylinder chambers 78 are formed at the two sides of the piston 73. By supplying fluid to the cylinder chambers 78, the piston 73 and the slide 74 and the connection mount 75 integrally formed with this move in the cylinder axial direction. The shock due to the collision of the end caps 77 and piston 73 when the piston 73 moves to the ends of the cylinder tube is absorbed by providing the end caps 77 with internal dampers 79.

On the other hand, the slit type rodless cylinder disclosed in Japanese Unexamined Patent Publication No. 11-13712 has substantially the same configuration as the slit type rodless cylinder 71 of Japanese Unexamined Patent Publication No. 10-318210, but the end caps are provided with not only internal dampers arranged inside the cylinder tube to absorb the shock of collision of the piston, but also external dampers arranged at the outside of the cylinder tube for absorbing the shock of collision with the slide. Further, the slit type rodless cylinder of Japanese Unexamined Patent Publication No. 11-13712 is of a type not using any connection mount. The external dampers and internal dampers simultaneously absorb the shock due to collision of the slide and piston with the end caps.

Figure 9:
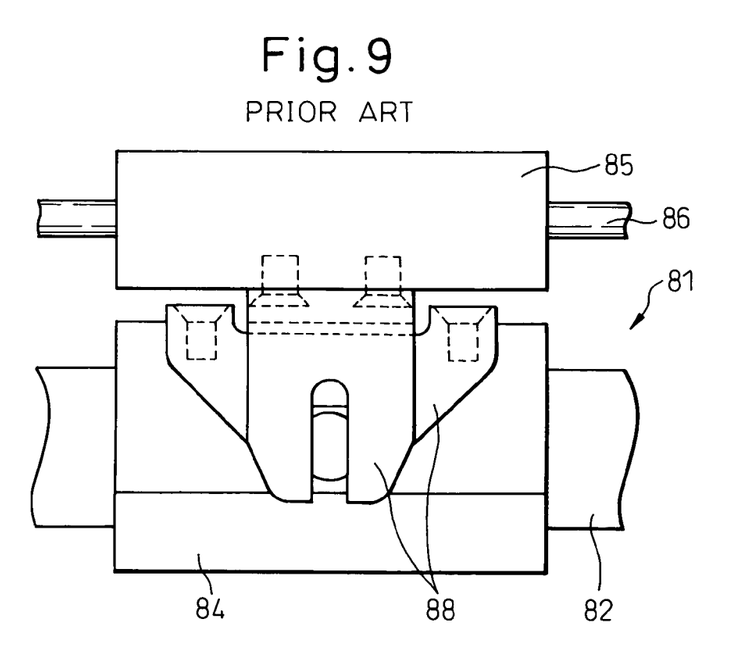

Further, the magnet type rodless cylinder 81 disclosed in Japanese Unexamined Utility Model Publication No. 7-28403 will be explained with reference to FIG. 9. FIG. 9 is a partial view of the magnet type rodless cylinder 81 disclosed in Japanese Unexamined Utility Model Publication No. 7-28403. The magnet type rodless cylinder 81 disclosed in Japanese Unexamined Utility Model Publication No. 7-28403 is provided with the same configuration as the conventional generally known one. That is, the magnet type rodless cylinder 81 is configured arranging in a cylinder tube 82 a piston having inside magnets (not shown) and movable in the axial direction of the cylinder tube 82, arranging a slide 84 having outside magnets at the outside of the cylinder tube 82, and magnetically coupling the piston and slide by the magnets across the wall surface of the cylinder tube 82. Due to this, by making the piston move in the cylinder tube 82, the slide 84 magnetically coupled with the piston moves along with the piston in the axial direction of the cylinder tube 82. The two ends of the cylinder tube 82 are provided with end caps (not shown). The slide 84 and piston are designed to be movable inside and outside of the cylinder tube 82 up to the end cap positions. Further, on the top surface of the slide 84, a connection mount 85 is attached through connecting hardware 88. The connection mount 85 is guided by a guide rail 86.

However, in the general magnet type rodless cylinder shown in Japanese Unexamined Utility Model Publication No. 7-28403, sometimes distinctive problems occur when the piston or slide stops due to striking/contacting the end caps. In a magnet type rodless cylinder, the piston and slide are not mechanically coupled, but are only magnetically coupled. For this reason, when the piston and slide move to a position striking/contacting an end cap and stop, if the inertial energy of the piston and slide causes positional deviation between the piston and slide, sometimes the magnetic coupling of the piston and slide ends up being lost. In particular, if providing a connection mount on the slide, when the connection mount strikes/contacts an end cap, the slide stops at a position separate from the end cap by exactly the amount of projection of the connection mount from the slide (that is, the connection mount first ends up striking/contacting the end cap, so the slide cannot move to its inherent striking/contacting position). Therefore, in this case, the problem arises that the piston ends up moving to a position striking/contacting the end cap against the magnetic coupling force due to its inertia and the magnetic coupling is easily lost.

Further, in the magnet type rodless cylinder disclosed in Japanese Examined Utility Model Publication No. 7-28403, assembly work of the connection mount is very burdensome and it is difficult to satisfy the requirement of the users such as attaching and detaching the connection mount in accordance with the size and kind of the works. Therefore, there has been a long time need for a magnet type rodless cylinder in which a connection mount can be attached or detached easily and is able to prevent disconnection of the magnet coupling between the piston and slide even when a connection mount is attached to the slide.

Therefore, as disclosed in Japanese Unexamined Patent Publication No. 10-318210 and Japanese Unexamined Patent Publication No. 11-13712, in a slit type rodless cylinder, various types of dampers are known. However, it should be noted that a slit type rodless cylinder and a magnet type rodless cylinder largely differ in purpose of attaching the dampers. That is, in a slit type rodless cylinder, since the piston and slide are formed as a single member, at the time of stopping, the positional deviation between the piston and slide does not cause the magnetic coupling to be lost. For this reason, in a slit type rodless cylinder, the dampers are only for absorbing impact at the time of collision of the slide and end caps. Therefore, if using such dampers as they are for a magnet type rodless cylinder, when for example the set external dampers are too large, the deviation between the striking/contacting position of the piston and the stopping position of the slide ends up becoming further larger and the above problem sometimes ends up being further aggravated.

SUMMARY OF THE INVENTION

In view of the problems in the related art as set forth above, one of the objects of the present invention is to provide a magnet type rodless cylinder where the piston and slide can stop at the striking/contacting positions regardless of not providing a connection mount.

According to the present invention, the object as set forth above is achieved by a magnet type rodless cylinder provided with a cylinder tube comprised of a non-magnetic member provided with end caps at its two ends, a piston able to move in the cylinder tube in the cylinder tube axial direction up to positions striking/contacting the end caps, and a slide comprised of a non-magnetic member arranged along the outer circumference of the cylinder tube and able to move in the cylinder tube axial direction, the piston being provided with an inside magnet and the slide being provided with an outside magnet or outside magnetic member, the inside magnet and the outside magnet or outside magnetic member magnetically coupling the piston and the slide, and the slide following the piston and moving in the cylinder tube axial direction, wherein the slide is provided on top of it with a connection mount in a detachable manner, the connection mount is provided with projecting parts projecting out from the slide in at least the cylinder tube axial direction in the state attached to the slide, the projecting parts of the connection mount strike/contact the end caps at the positions where the piston strikes/contacts the end caps, and provision is made of external dampers detachably attached to the end caps or the slide when detaching the connection mount from the slide and striking/contacting the slide from which the connection mount is detached or the end caps when the piston is at the striking/contacting positions.

Preferably, the amount of projection of the external dampers from the end caps or slide is made substantially the same extent as the amount of projection of the projecting parts of the connection mount from the slide in the cylinder tube axial direction.

Preferably, each end cap is provided with a holding space able to hold at least part of a projecting part of the connection mount.

Preferably, each external damper is provided at its base with a plastic attachment projection (snap-fit boss) having elasticity, the end cap or slide is provided with a receiving hole of a smaller diameter than the attachment projection, and the attachment projection is made to elastically deform to be inserted in the receiving hole so as to detachably attach the external damper to an end cap or the slide.

In this specification, "striking/contacting" means the piston or slide or connection mount approaching an end cap up to the limit. It means both the two actually abutting against each other and also the two not abutting, but approaching each other up to a predetermined lower distance. Further, "substantially the same extent" in the amount of projection of the external dampers includes the same amount plus or minus a range of an extent where the magnetic coupling between the piston and slide is not lost.

According to the present invention, when no connection mount is set, since external dampers striking/contacting the slide are provided, there will not be any large positional deviation between the slide and piston even in a state not providing a connection mount. For this reason, it is possible to reliably prevent the situation where the magnetic coupling between the piston and slide ends up being lost. Further, since the external dampers are freely detachable, it is possible to attach/detach the external dampers so as to easily handle the detaching/attaching connection mount. Further, by making the amount of projection of the external dampers from the end caps substantially the same extent as the amount of projection of the projecting parts of the connection mount from the slide, it is possible to reliably prevent the situation where the magnetic coupling between the piston and slide ends up being lost. Further, by making it possible for parts of the projecting parts of the connection mount projecting out from the slide to be housed in the end caps at the striking/contacting positions, it is possible to increase the range of movement of the slide, that is, the piston, and possible to use a large connection mount with a large amount of projection from the slide. Further, by making it possible to attach the external dampers to the end caps or slide by engagement of plastic attachment projections (snap-fit bosses) having elasticity provided at the base part and receiving holes of diameters smaller than the attachment projections provided at the end caps or slide, attachment and detachment of the external dampers becomes easy, so handling becomes extremely easy regardless of the presence or absence of the connection mount. Further, by using the elasticity of the plastic attachment projections to hold the attachment projections in the receiving holes, it is possible to reliably attach the external dampers and prevent unintentional detachment, form a streamlined structure with fewer parts, and reduce the cost of production of magnet type rodless cylinders.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENT

Below, a magnet type rodless cylinder according to an embodiment of the present invention will be explained based on the drawings.

Figure 1A:
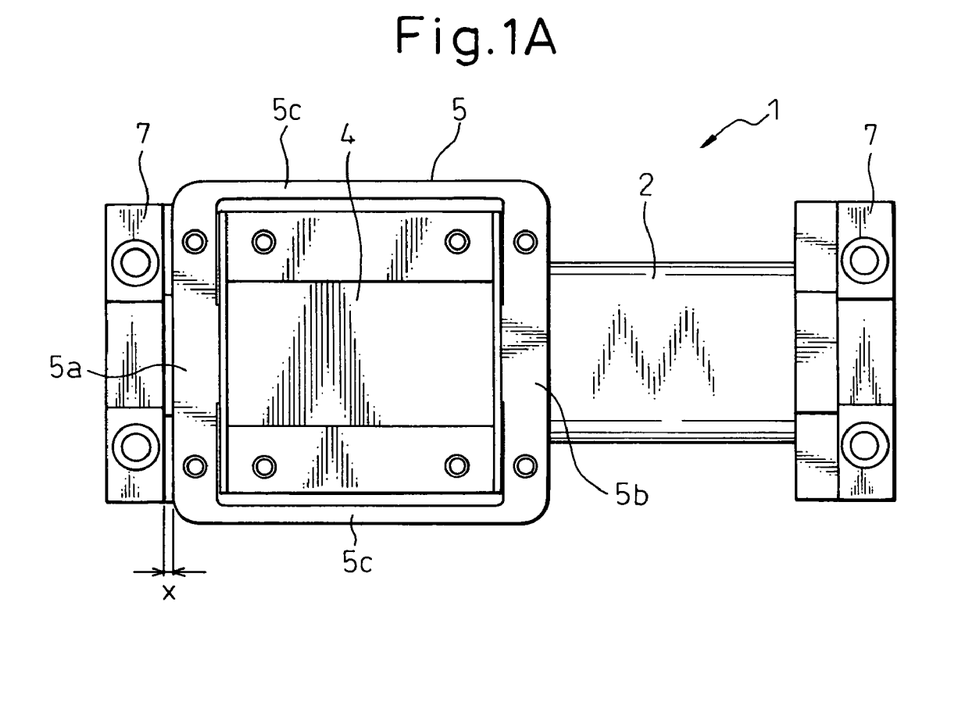
FIG. 1A is a top view of a magnet type rodless cylinder in the state provided with the connection mount.
Figure 1B:
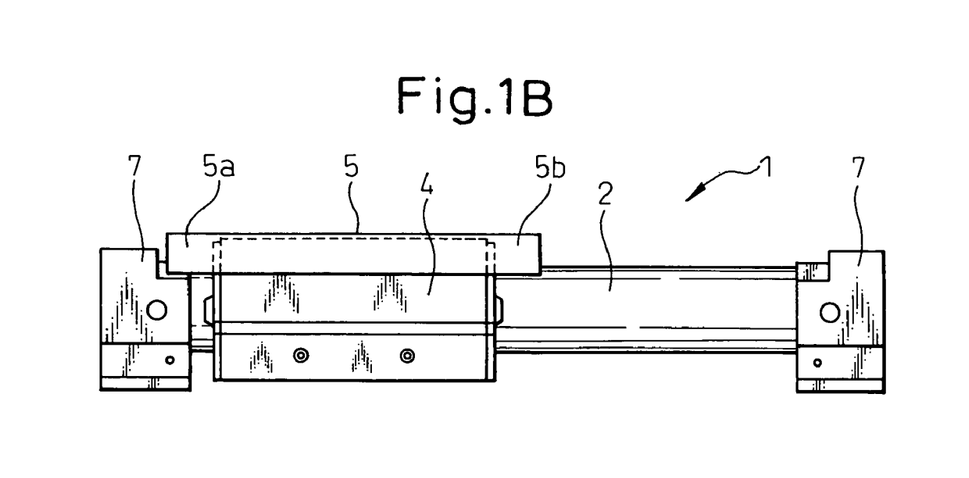
FIG. 1B is a side view of a magnet type rodless cylinder in the state provided with the connection mount.
Figure 1C:
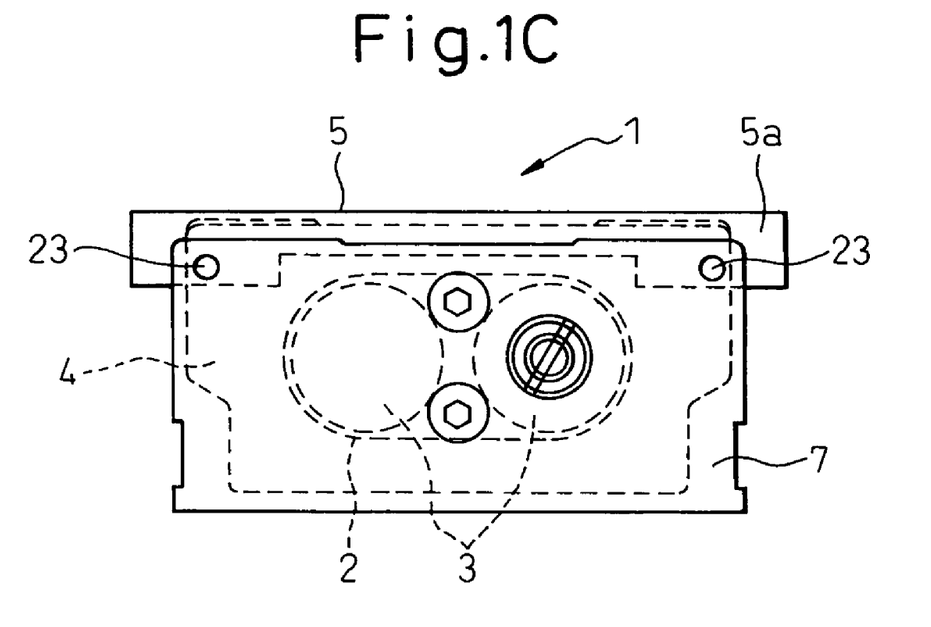
FIG. 1C is a front view of a magnet type rodless cylinder in the state provided with the connection mount.
Figure 2:
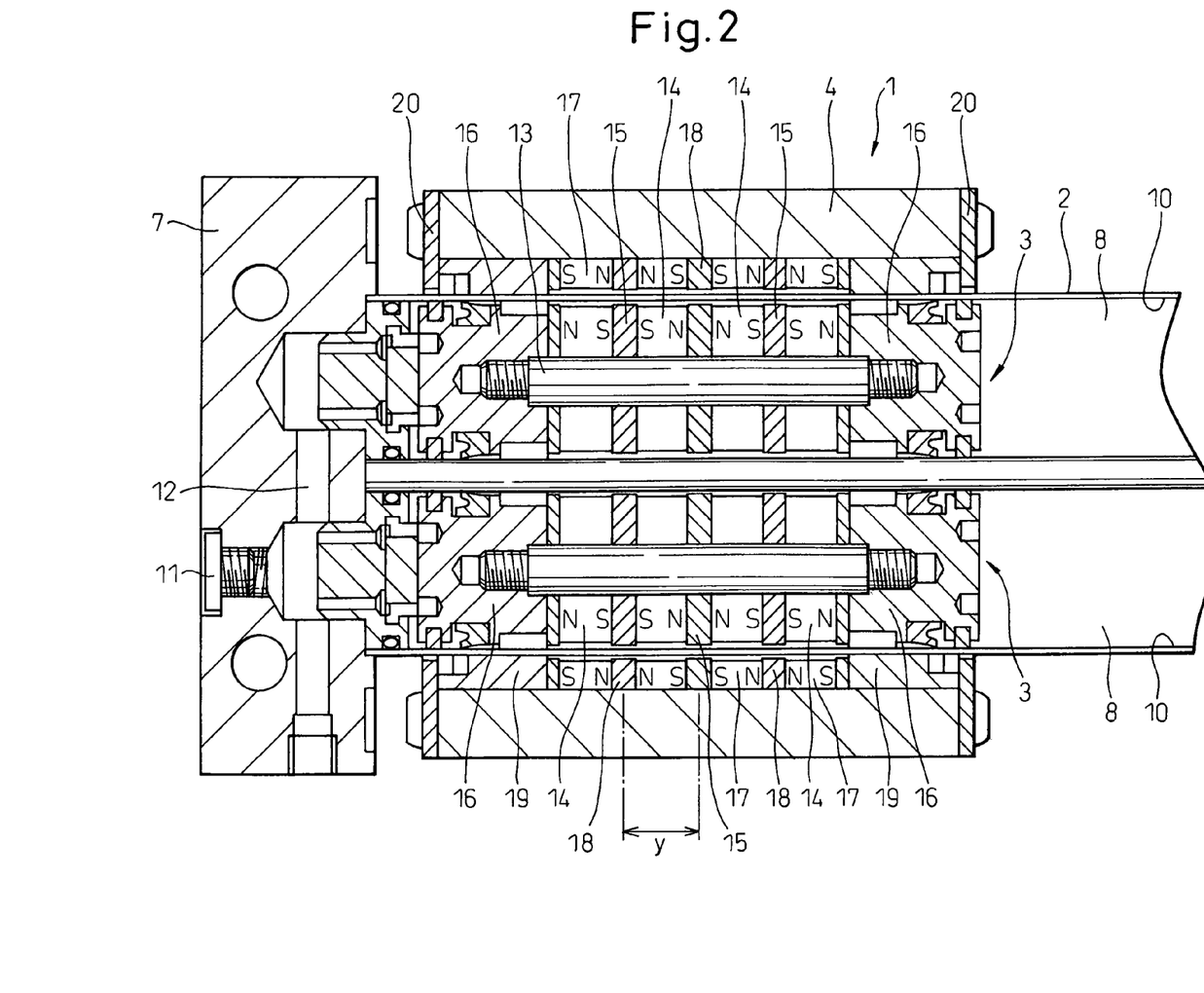
FIG. 2 is a sectional view of a magnet type rodless cylinder.

FIG. 1 gives views of a magnet type rodless cylinder (hereinafter referred to as a "rodless cylinder") 1 in the state provided with a connection mount 5, wherein FIG. 1A is a view of the rodless cylinder 1 as seen from the top, FIG. 1B is a view of the rodless cylinder 1 as seen from the side, and FIG. 1C is a view of the rodless cylinder 1 as seen from the front. Further, FIG. 2 is a sectional view showing the inside of a cylinder tube 2 of the rodless cylinder 1. Further, FIG. 1A and FIG. 1B show the state where the connection mount 5 provided on the slide 4 is positioned at a position where the front side strikes/contacts an end cap 7.

The rodless cylinder 1 is comprised of a cylinder tube 2 made of a non-magnetic material to the two ends of which end caps 7 are attached and a slide 4 with a rectangular horizontal cross-sectional shape able to slide in the axial direction of the cylinder tube 2. The cylinder tube 2 exhibits a flat elliptical shape in outer shape. By passing through the slide 4, it can guide the slide 4 in the axial direction in the horizontal posture as is. Further, reference numeral 5 is a connection mount set at the top surface of the slide 4. The connection mount 5 is a ring shaped member integrally connecting the front wall 5a and rear wall 5b having the same extent of thickness by the side walls 5c, 5c. The outer circumference of the connection mount 5 is one size larger than the slide 4. It is formed to a size projecting out to the front side and rear side of the slide 4 at least at the time of placement. The connection mount 5 holds the workpiece placed on its top surface utilizing the holding space surrounded by the front wall 5a, rear wall 5b, and side walls 5c, 5c. Further, as shown in FIG. 1C, the center parts of the front wall 5a and rear wall 5b are formed thinner than the left and right ends, so a cross-sectional M shape is formed when seen from the front side (or rear side).

Further, inside the cylinder tube 2, as shown in FIG. 1C and FIG. 2, a pair of cylinder bores 10 with circular horizontal cross-sections are provided in parallel. Inside each cylinder bore 10, a piston 3 is housed movably in the axial direction of the cylinder tube 2 and divides the inside of the cylinder bore 10 into front and rear cylinder chambers 8. Each piston 3 is comprised of a center piston shaft 13 over which donut shaped inside magnets 14 and similar donut shaped inside yokes 15 are alternately fit and having two ends fastened and fixed by piston ends 16. The magnetic poles of the inside magnets 14 are arranged in the configuration NS, SN, NS, SN so that the same poles face each other in the axial direction. For this reason, the same poles of the inside magnets 14 face each other between adjoining pistons 3.

Further, in the through part of the cylinder tube 2 at the slide 4, a plurality of oval shaped donut shaped outside magnets 17 surrounding the cylinder tube 2 and similarly shaped outside yokes 18 are alternately arranged in the axial direction. The outside magnets 17 and yokes 18 are fixed in the axial direction by fastening and fixing end plates 20 arranged at the two ends through outside wear rings 19. The magnetic poles of these outside magnets 17 are arranged in the configuration SN, NS, SN, NS so that the same poles face each other in the axial direction and so that the poles become different from the magnetic poles of the inside magnets 14 at the piston 3 side. The magnetic attraction force between the two sets of magnets magnetically couples the two pistons 3 and the slide 4.

Figure 3A:
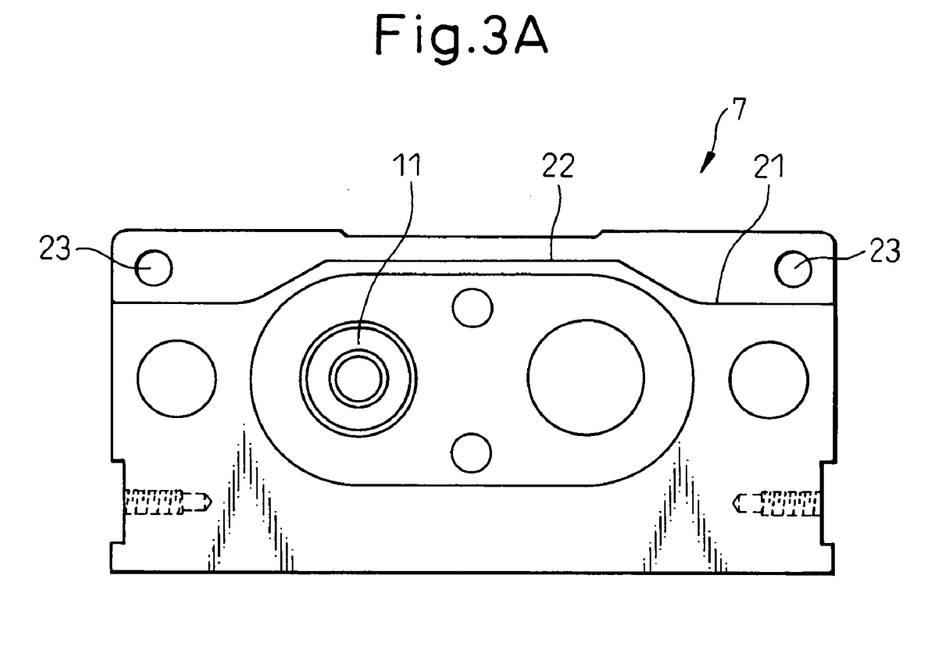
FIG. 3A is a view of the surface of the end cap at the cylinder tube side.
Figure 3B:
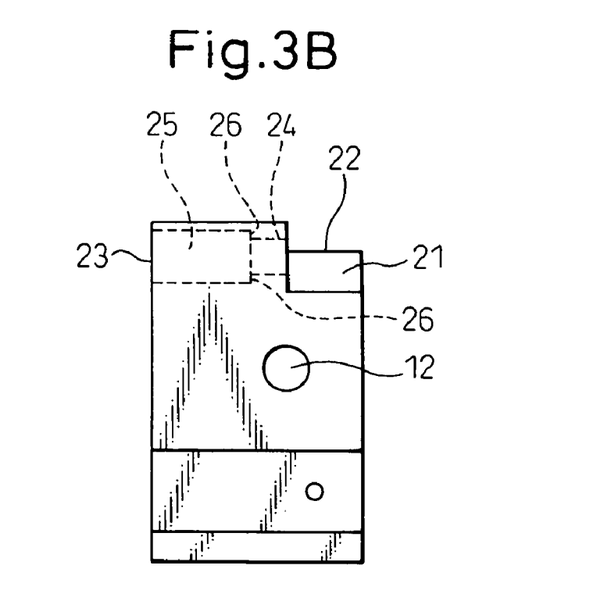
FIG. 3B is a side view of an end cap.

Next, referring to FIG. 2 and FIG. 3A, FIG. 3B, the end caps 7 will be explained. FIG. 3A is a view of the surface of an end cap 7 at the cylinder tube 2 side (hereinafter referred to as the "inside surface of the end cap 7"), while FIG. 3B is a view of the side surface of an end cap 7. Each end cap 7 is formed with a feed/exhaust port 11 and a channel 12 connecting from the feed/exhaust port 11 to the cylinder chambers 8. Further, in the rodless cylinder 1, compressed air is alternately supplied from the feed/exhaust ports 11 provided at the two end caps 7 so as to make the pistons 3 reciprocate inside the cylinder bores 10 synchronously.

Further, at the top edge of the inside surface of each end cap 7, a holding space of the front wall 5a or rear wall 5b of the connection mount 5 constituted by a cutaway step 21 is provided across the left-right direction (in FIG. 3A). A ridge 22 is provided at the center part of the bottom surface of the cutaway step 21 (in the left-right direction). Further, the wall surface of the cutaway step 21 is provided with receiving holes 23 for attachment of the later explained external dampers 30 in a state passing through the end cap 7 to the outside surface. Each receiving hole 23, as shown in FIG. 3B, is formed at its inside (inside of end cap 7) with a small diameter part 24 and at its outside (outside of end cap 7) with a large diameter part 25. Further, the wall surface formed at the boundary between the small diameter part 24 and large diameter part 25 acts as an engagement wall 26 when attaching the external damper 30 (FIG. 4) as explained later.

In the rodless cylinder 1, by alternately supplying compressed air from the feed/exhaust ports 11 of the front and rear end caps 7, the two pistons 3 reciprocate inside the cylinder bores 10 of the cylinder tube 2 synchronously striking/contacting the two end caps 7. Due to this, the magnetic coupling between the inside magnets 14 and outside magnets 17 causes the slide connected to the pistons 3 to follow the pistons 3 and reciprocate along the cylinder tube 2.

In the reciprocating motion, when pistons 3 are positioned near the striking/contacting positions, the front wall 5a or rear wall 5b of the connection mount 5 set at the slide 4 is held on the cutaway step 21. Therefore, the slide 4 can also move until striking/contacting the end caps 7, that is, until the connection mount 5 and an end cap 7 strike/contact. Further, the thin center part of the front wall 5a or rear wall 5b is positioned on the ridge 22.

Figure 6:
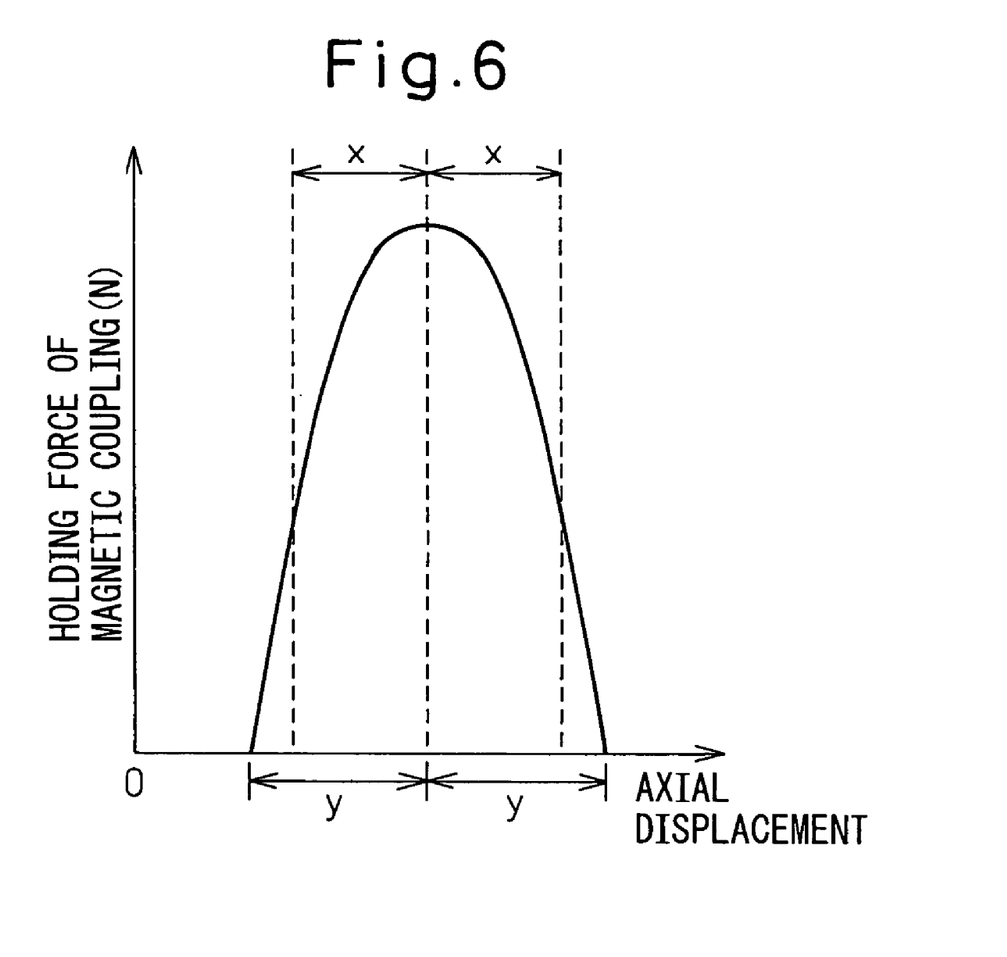
FIG. 6 is a view of the relationship between the magnetic coupling force between a piston and slide and the amount of displacement in the axial direction.

At the striking/contacting positions, the slide 4 or connection mount 5 and the end caps 7 does not actually abut. However, due to the reciprocating motion, the pistons 3 and slide 4 have inertial energy. Therefore, since the slide 4 does not stop immediately even when the pistons 3 stop at the striking/contacting positions, only the slide 4 becomes somewhat positionally deviated in the axial direction against the magnetic coupling. In this embodiment, the axial lengths of the inside magnet 14 and the outside magnet 17 are 5 mm and the axial lengths of the inside yoke 15 and the outside yoke 18 are 3 mm, respectively. Generally, when the amount of displacement of the slide in the axial direction exceeds a half of the axial pitch of the magnets (a half of the sum of the axial lengths of the magnet and yoke, i.e., 4 mm (y width in FIG. 6) in this embodiment), the magnetic coupling between the piston 3 and slide 4 ends up being lost, or the magnetic coupling between the piston 3 and the slide 4 shifts to the position defined by adjacent magnets.

According to the rodless cylinder 1 of the present embodiment, when the pistons 3 are positioned at a striking/contacting position, the front wall 5a or rear wall 5b of the connection mount 5 and the wall surface (end cap 7) of the cutaway step 21 become the striking/contacting position, so it is possible to reliably prevent the situation where the magnetic coupling between the pistons 3 and slide 4 ends up becoming lost. Further, in the present embodiment, the bottom surface of the cutaway step 21 is provided with a ridge 22. When the pistons 3 are positioned at a striking/contacting position, the ridge 22 is sandwiched in by the thick part of the front wall 5a or rear wall 5b of the connection mount 5. For this reason, it is possible to prevent offset of the connection mount 5 and in turn the slide 4 in the left-right direction.

Figure 4A:
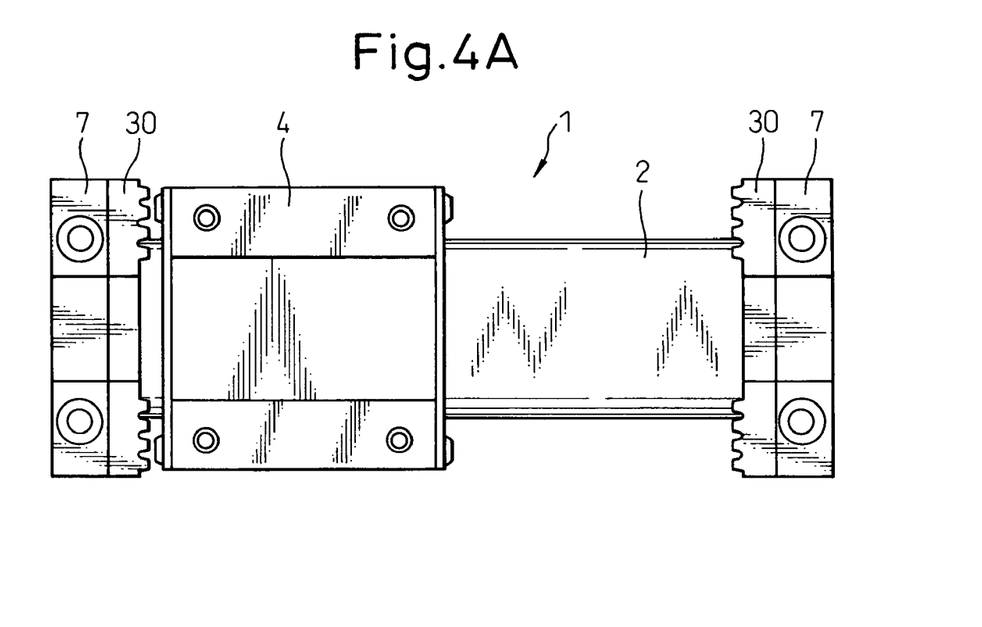
FIG. 4A is a top view of a magnet type rodless cylinder in the state not provided with the connection mount.
Figure 4B:
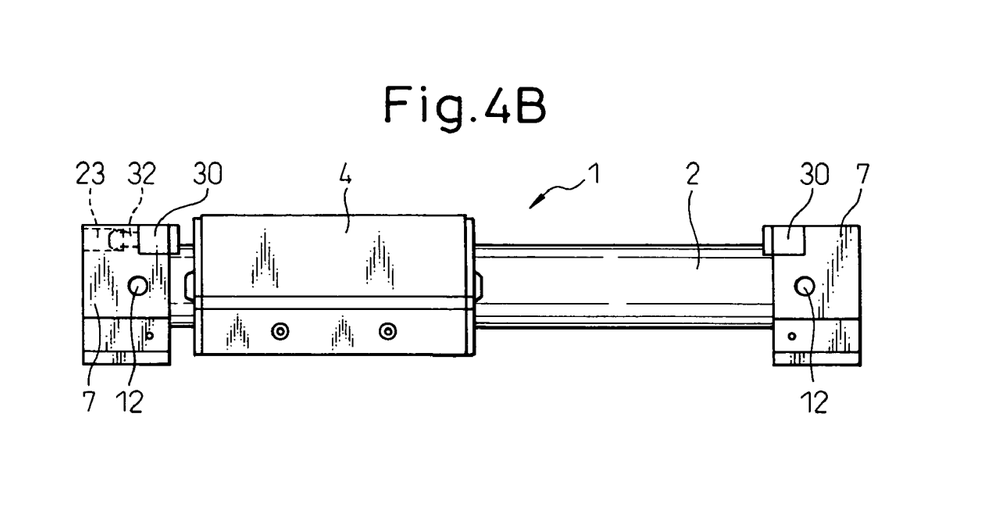
FIG. 4B is a side view of a magnet type rodless cylinder in the state not provided with the connection mount.

Next, the case of using the rodless cylinder 1 without attaching the connection mount 5 will be explained. FIG. 4A and FIG. 4B are views of a rodless cylinder 1 in the state not providing the connection mount 5, wherein FIG. 4A is a view of the rodless cylinder 1 as seen from above and FIG. 4B is a view of the rodless cylinder 1 as seen from the side. When using the rodless cylinder 1 without attaching the connection mount 5, when the pistons 3 are positioned at a striking/contacting position, the distance of the slide 4 from the end cap 7 becomes longer than the distance at the striking/contacting position due to the removal of the connection mount 5. Therefore, the two end caps 7 have external dampers 30 bulging out to the slide 4 side attached to them.

Figures 5A, 5B:
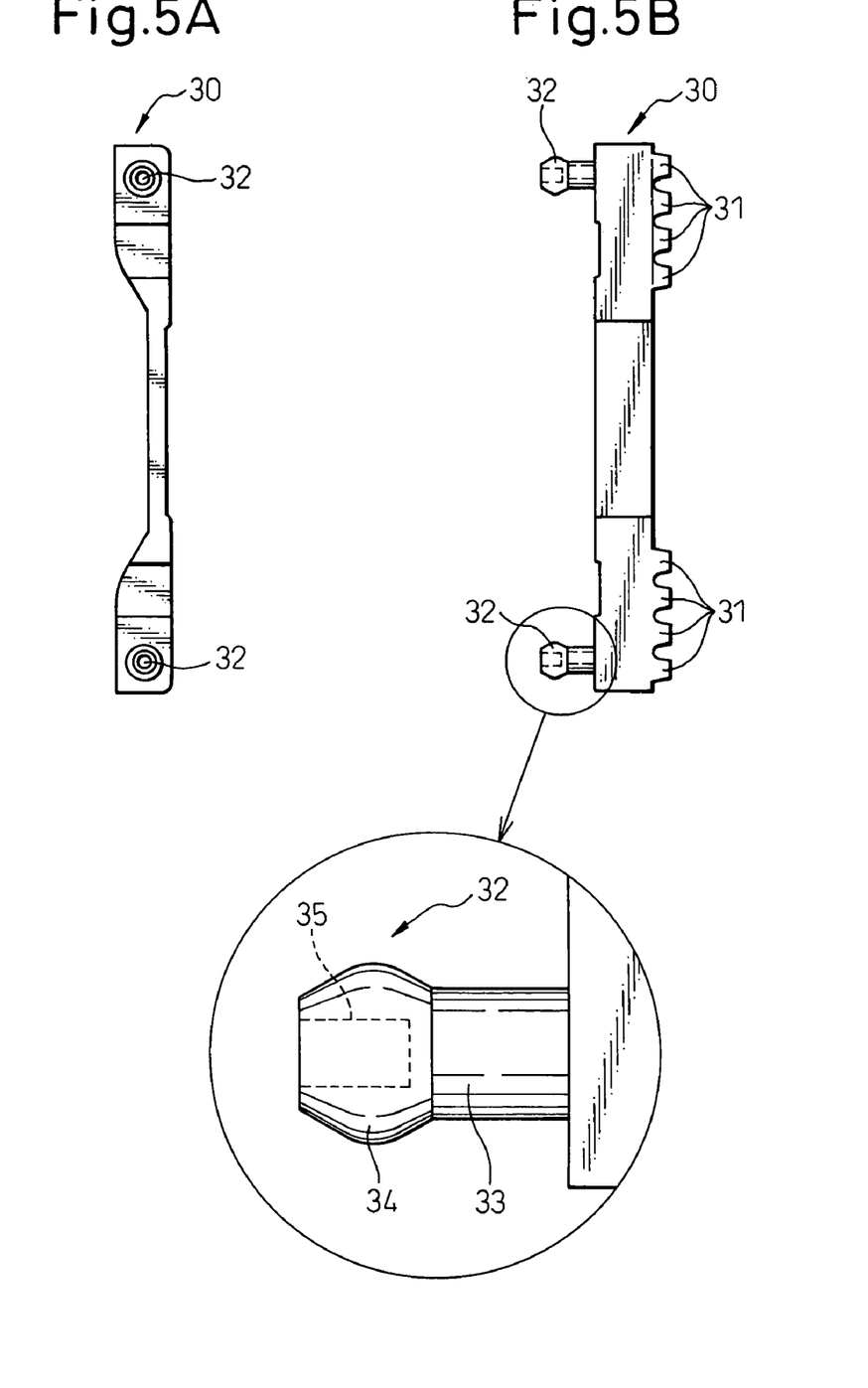
FIG. 5A is a front view of an external damper.
FIG. 5B is a top view and partially enlarged view of an external damper.

Here, an external damper 30 will be explained based on FIG. 5A to FIG. 5B. FIG. 5A is a view of the external damper 30 as seen from the front, while FIG. 5B is a view of the external damper 30 as seen from above and partially enlarged. The external damper 30 is formed into a substantially box shape from plastic having elasticity. The left and right ends at the back surface are integrally formed with pluralities of projecting parts 31 for absorbing the shock at the time of collision with the slide 4. The external damper 30 is set on the cutaway step 21 of an end cap 7. The width of the external damper 30 in the front-back direction (except for the projecting parts 31 and later explained attachment projections (snap-fit bosses) 32) and height in the vertical direction are set so as to substantially match with the front-rear direction width of the cutaway step 21 and height of the wall surface. Further, the bottom surface of the external damper 30 is provided with relief shapes corresponding to the bottom surface of the cutaway step 21. Further, the length from the front surface of the external damper 30 to the projecting parts 31 is set to become substantially the same extent as the front wall 5a or rear wall 5b of the connection mount 5, that is, the slide 4 and the projecting parts 31 of the external damper 30 are set within the striking/contacting distance when the pistons 3 are positioned at a striking/contacting position.

On the other hand, the left and right ends at the front surface of the external damper 30 are integrally formed with attachment projections 32 for engagement with receiving holes 23 formed in the wall surface of the cutaway step 21. Each attachment projection 32 is formed by plastic having elasticity into a substantially cylindrical shape and is comprised of a base part having substantially the same diameter as a receiving hole 23 and an attachment part 34 provided at the front end side from the base part 33. The attachment part 34 has a part of a diameter larger than the base part 33 and is formed in a bulging shape so that the center part in the axial direction becomes the largest in diameter. The front end surface (front surface) of the attachment part 34 is provided with a round hole 35. The round hole 35 enables large deformation of the attachment part 34 (deformation until enabling insertion into receiving hole 23).

Further, the amount of projection of each attachment projection 32 from the front surface of the external damper 30 as a whole is formed shorter than the axial direction length of the receiving hole 23, and the amount of projection of the base part 33 of each attachment projection 32 is formed to be substantially the same as the axial direction length of the small diameter part 24 of the receiving hole 23. The external damper 30 is attached to an end cap 7 by inserting the attachment parts 34 of the attachment projections 32 into the small diameter part 24 side of the receiving holes 23. At the time of this insertion, since the attachment part 34 of each attachment projection 32 is formed with a round hole 35, the attachment part 34 having a part larger in diameter than the small diameter part 24 can be inserted into the small diameter part 24. Further, in the state of attachment of the external damper 30, the attachment part 34 is positioned at the large diameter part 25 of the receiving hole 23. Therefore, the bulgingly formed attachment part 34 is engaged with the engagement wall 26 in the receiving hole 23 to prevent the unintentional detachment of the external damper 30. Further, when desiring to detach the external damper 30, it is sufficient to apply a force of an extent where the attachment parts 34 are deformed in the receiving holes 23 in a direction pulling out the attachment projections 32 from the receiving holes 23.

According to the rodless cylinder 1 of the present embodiment with external damper 30, when the pistons 3 are positioned at a striking/contacting position, the slide 4 and external damper 30 strike/contact each other, so the slide 4 will not become offset in position with respect to each piston 3 by the striking/contacting distance or more and the situation of the magnetic coupling between each piston 3 and slide 4 ending up becoming lost can be reliably prevented. Further, since the external damper 30 is provided with a plurality of projecting parts 31, the inertial energy of the slide 4 can be effectively absorbed and, for example, the workpiece etc. carried on the slide 4 can be protected from shock at the time of collision.

Further, each external damper 30 is designed to be able to be attached to an end cap 7 just by inserting the attachment projections 32 into the receiving holes 23. Further, since the attachment parts 34 are provided with the round holes 35, it is possible to easily insert them into the small diameter parts 24 of the receiving holes 23 smaller in diameter than the attachment parts 34. Further, when detaching a once attached external damper 30 as well, it is sufficient to apply a force of an extent where the attachment parts 34 deform in the receiving holes 23 in a direction pulling out the attachment projections 32 from the receiving holes 23. No tool etc. is required. That is, in the present embodiment, the work of attaching or detaching the external damper can be simply performed without using any tool etc., so it is possible to quickly and easily deal with the external damper according to whether the connection mount 5 is to be attached to the rodless cylinder 1. Further, in the present embodiment, each receiving hole 23 is configured as a stepped shape of a small diameter part 24 and a large diameter part 25. The boundary is made the engagement wall 26. Each attachment projection 32 is provided with an attachment part 34 having a part of a larger diameter than the small diameter part 24. For this reason, in the state of attachment of an external damper 30, the attachment parts 34 becomes engaged with the engagement wall 26, and unintentional detachment of the external damper 30 etc. can be prevented.

Note that the configuration of the magnet type rodless cylinder of the present invention is not limited in any way to the above embodiments. The materials, shapes, structures, attachment positions, and rest of the configurations of the cylinder tube, pistons, slide, end caps, connection mount, and external dampers may be suitably changed in accordance with need in a range not out of the gist of the present invention.

Figure 7A:
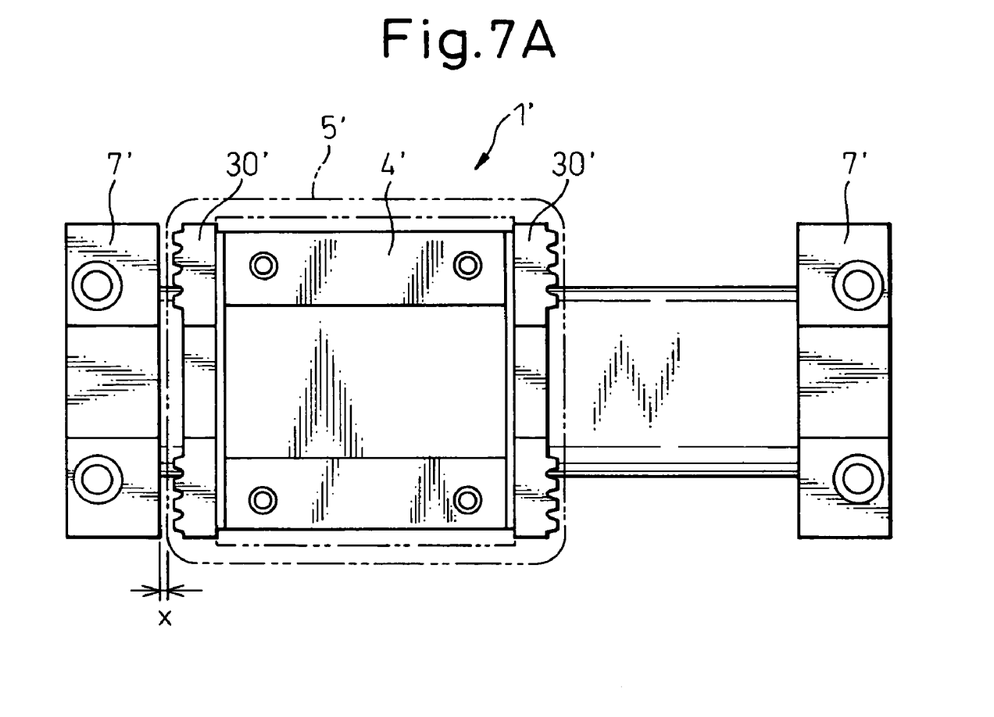
FIG. 7A is a top view of a magnet type rodless cylinder in the state providing external dampers at the slide.
Figure 7B:
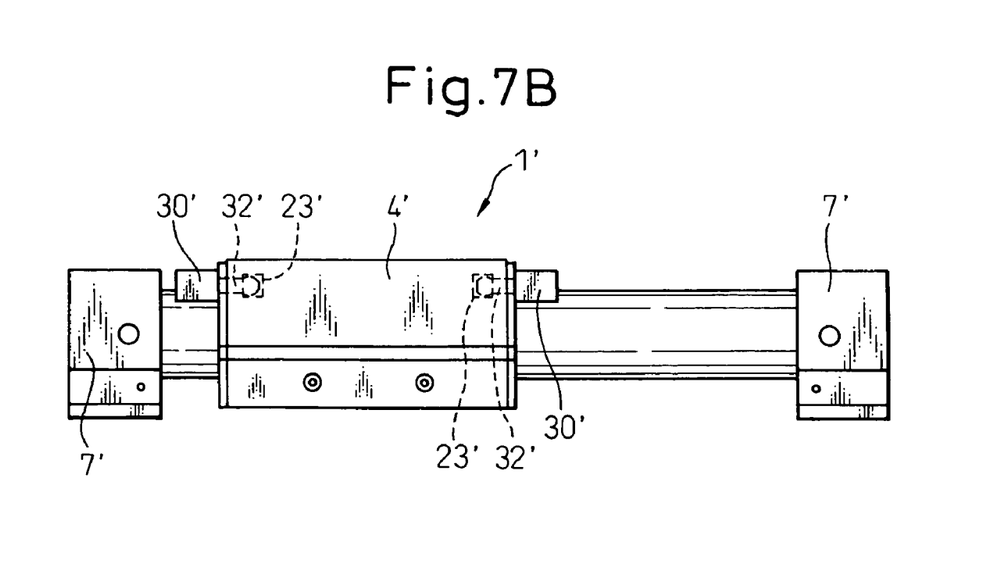
FIG. 7B is a side view of a magnet type rodless cylinder in the state providing external dampers at the slide.

For example, each external damper may also be made detachable from the slide. A magnet type rodless cylinder 1' having this configuration will be explained based on FIG. 7A and FIG. 7. FIG. 7A is a view of a magnet type rodless cylinder 1' provided with external dampers 30' at a slide 4' as seen from above. In FIG. 7A, the connection mount 5', which is indicated by a phantom line is removed from the slide 4'. FIG. 7B is a view of a magnet type rodless cylinder 1' provided with external dampers 30' at a slide 4' as seen from the side.

The magnet type rodless cylinder 1' is configured substantially the same as the magnet type rodless cylinder 1 of the above embodiment except for the point that it enables the external dampers 30' to be detachably attached to the slide 4' and is provided at the slide 4' with receiving holes 23' for attaching the external dampers 30' and the point that the end caps 7' are not provided with the cutaway steps, the receiving holes, etc. Each external damper 30' is also provided with substantially the same configuration as the external dampers 30 of the above embodiment. The external damper's length in the front-rear direction is designed to be substantially the same as the thickness of the front wall or rear wall of the connection mount (indicated by the phantom line in FIG. 7A) able to be set at the slide 4'. Further, by inserting the attachment projections 32' provided projecting out at the left and right ends in the receiving holes 23', the damper is attached to the slide 4'.

In this way, when setting the external dampers 30' to be detachably attached to the slide 4', it is possible to obtain the same effect as an embodiment setting the external dampers 30 detachably attached to the end caps 7. Further, by making the external dampers 30' detachably attachable to the slide 4', it is possible to obtain the merit of enabling the configuration of the end caps 7' to be streamlined. Further, to obtain a wide range of movement of the slide 4', the end caps 7' may also be provided with cutaway steps (holding spaces) able to hold the connection mount and external dampers 30' like in the embodiment of FIG. 1.

On the other hand, the amount of displacement of the pistons and slide in the axial direction where the magnetic coupling between the pistons and slide ends up being lost, or the position of the coupling between the pistons and slide shifts, is dominated by a magnetic coupling force determined by the number or size of the inside magnets or outside magnets, the kinetic energy at the striking/contacting position determined by the masses and the velocities of the pistons, slide, connection mount, etc. Therefore, striking/contacting distance is not limited to 3 mm if the axial lengths of the inside and outside magnets and the inside and outside yokes are different from those in the above embodiment. Therefore, the width in the front-rear direction of the cutaway step provided at the end caps, the amount of projection of the projecting parts in the external dampers, etc. may be freely changed for each magnet type rodless cylinder.

Further, in the above embodiment or modification, a configuration providing the attachment parts of the attachment projections with round holes to facilitate deformation was employed, but instead of the round holes, it is further possible to use attachment parts able to deform by providing a plurality of cuts or grooves at the surface. Further, it is naturally also possible to form the attachment parts or attachment projections separate from the external dampers and possible to suitably change the number, positions of placement, etc. of the attachment projections. Further, if it is possible to prevent unintentional detachment by just the force pressing against the wall surface inside the receiving holes, it is not necessary to provide the receiving holes with small diameter parts or large diameter parts, engagement walls, etc. Further, in the above embodiment or modification, one end cap (or slide) has one external damper attached to it, but for example there is no problem at all even if the external damper in the above embodiment or modification is split into left and right pieces to reduce the size and a single end cap (or slide) is provided with a plurality of external dampers. In addition, the positions of the attachment of the external dampers are not limited to the cutaway step portion and the attachment positions may also be suitably changed.

Further, by adjusting the striking/contacting positions of the pistons, it is also possible to configure the end caps without housing space for the connection mount. That is, if configuring the cylinder to make the positions where the connection mount strikes/contacts the end caps not provided with the holding spaces the striking/contacting positions of the pistons and detachably providing at the end caps external dampers having an amount of projection substantially the same as the front wall or rear wall of the connection mount, the object of the present invention can be achieved. Further, even when providing the holding spaces, they are not limited to cutaway steps like in the above embodiment. There is no problem at all even if providing holding spaces at only the positions contacting the connection mount. Further, a plurality of holding spaces may naturally also be provided at one end cap.

On the other hand, regarding to the configuration of the magnet type rodless cylinder itself, in the above embodiment and its modifications, a pair of cylinder bores and pistons are provided inside a single elliptically shaped cylinder tube, but it is also possible to provide three or more cylinder bores and pistons. In addition to a single cylinder tube, it is also possible to provide aligned with each other a plurality of circular cross-section cylinder tubes each housing a cylinder bore and piston. Conversely, the present invention can be employed even to a single cylinder housing a cylinder bore and piston. In addition, the cylinder bore may be shaped not only as a true circle, but also as a rectangle or polygon or other various types of shapes. The piston or slider and inside magnet or outside magnet may also be suitably changed in accordance with the form of the cylinder tube. Further, if there is a magnetic member able to be magnetically coupled with the inside magnets in the slider, the outside magnets may also be omitted.

While the invention has been described with reference to specific embodiments chosen for purpose of illustration, it should be apparent that numerous modifications could be made thereto by those skilled in the art without departing from the basic concept and scope of the invention.

The invention claimed is:

1. A magnet type rodless cylinder comprising a non-magnetic cylinder tube disposed between end caps at two ends of the cylinder tube, a piston able to move in said cylinder tube in an axial direction of the cylinder tube up to positions for striking/contacting said end caps, and a non-magnetic slide arranged along an outer circumference of said cylinder tube and able to move in the axial direction of the cylinder tube, said piston being provided with an inside magnet and said slide being provided with an outside magnet or outside magnetic member, said inside magnet and said outside magnet or outside magnetic member magnetically coupling said piston and said slide, so that when said piston is moved, said slide follows said piston and moves in the axial direction of the cylinder tube, wherein the magnet type rodless cylinder includes at any one time one of a connection mount and external dampers said connection mount being removably attachable to a top of the slide and having projecting parts projecting out from said slide in at least the axial direction of the cylinder tube when the connection mount is attached to the slide, so that the distance between each projecting part of said connection mount and each end cap is set at a value smaller than a predetermined value when the piston is at the positions for striking/contacting said end caps, and said external dampers being removably attachable to said end caps so that the distance between each external damper and said slide is set at a value smaller than said predetermined value when the piston is at the positions for striking/contacting said end caps, wherein said predetermined value is a half of an axial pitch length of a magnetic circuit comprised of the inside magnet and an internal yoke arranged alternately with the inside magnet and wherein when the connection mount is attached to the slide, the external dampers are not attached to the end caps and when the external dampers are attached to the end caps, the connection mount is not attached to the slide.

2. The magnet type rodless cylinder as set forth in claim 1, wherein the amount of projection of the external dampers from said end caps is made substantially the same as the amount of projection of the projecting parts of said connection mount from the slide in the axial direction of the cylinder tube.

3. The magnet type rodless cylinder as set forth in claim 2, wherein each end cap is provided with a holding space able to hold at least part of a projecting part of the connection mount.

4. The magnet type rodless cylinder as set forth in claim 3, wherein each external damper is provided at a base of the damper with a plastic attachment projection having elasticity, said end cap is provided with a receiving hole of a smaller diameter than said attachment projection, and said attachment projection is made to elastically deform so that it can be inserted into said receiving hole to removably attach said external damper to said end cap.

5. The magnet type rodless cylinder as set forth in claim 2, wherein each external damper is provided at a base of the damper with a plastic attachment projection having elasticity, said end cap is provided with a receiving hole of a smaller diameter than said attachment projection, and said attachment projection is made to elastically deform so that it can be inserted into said receiving hole to removably attach said external damper to said end cap.

6. The magnet type rodless cylinder as set forth in claim 1, wherein each end cap is provided with a holding space able to hold at least part of a projecting part of the connection mount.

7. The magnet type rodless cylinder as set forth in claim 6, wherein each external damper is provided at a base of the damper with a plastic attachment projection having elasticity, said end cap is provided with a receiving hole of a smaller diameter than said attachment projection, and said attachment projection is made to elastically deform so that it can be inserted into said receiving hole to removably attach said external damper to said end cap.

8. The magnet type rodless cylinder as set forth in claim 1, wherein each external damper is provided at a base of the damper with a plastic attachment projection having elasticity, said end cap is provided with a receiving hole of a smaller diameter than said attachment projection, and said attachment projection is made to elastically deform so that it can be inserted into said receiving hole to removably attach said external damper to said end cap.

9. A magnet type rod less cylinder comprising a non-magnetic cylinder tube disposed between end caps at two ends of the cylinder tube, a piston able to move in said cylinder tube in an axial direction of the cylinder tube up to positions for striking/contacting said end caps, and a non-magnetic slide arranged along an outer circumference of said cylinder tube and able to move in the axial direction of the cylinder tube, said piston being provided with an inside magnet and said slide being provided with an outside magnet or outside magnetic member, said inside magnet and said outside magnet or outside magnetic member magnetically coupling said piston and said slide, so that when said piston is moved, said slide follows said piston and moves in the axial direction of the cylinder tube, wherein the magnet type rodless cylinder includes at any one time one of a connection mount and external dampers said connection mount being removably attachable to a top of the slide and having projecting parts projecting out from said slide in at least the axial direction of the cylinder tube when the connection mount is attached to the slide, so that the distance between each projecting part of said connection mount and each end cap is set at a value smaller than a predetermined value when the piston is at the positions for striking/contacting said end caps, and said external dampers being removably attachable to each end of said slide in the axial direction of the cylinder tube so that the distance between each external damper and said end cap is set at a value smaller than said predetermined value when the piston is at the positions for striking/contacting said end caps, wherein said predetermined value is a half of an axial pitch length of a magnetic circuit comprised of the inside magnet and an internal yoke arranged alternately with the inside magnet and wherein when the connection mount is attached to the slide, the external dampers are not attached to the slide and when the external dampers are attached to the slide, the connection mount is not attached to the slide.

10. The magnet type rodless cylinder as set forth in claim 9, wherein the amount of projection of the external dampers from said slide is substantially the same as the amount of projection of the projecting parts of said connection mount from the slide in the axial direction of the cylinder tube.

11. The magnet type rodless cylinder as set forth in claim 10, wherein each end cap is provided with a holding space able to hold at least part of a projecting part of the connection mount.

12. The magnet type rodless cylinder as set forth in claim 11, wherein each external damper is provided at a base of the damper with a plastic attachment projection having elasticity, said slide is provided with a receiving hole of a smaller diameter than said attachment projection, and said attachment projection is made to elastically deform so that it can be inserted into said receiving hole to removably attach said external damper to said slide.

13. The magnet type rodless cylinder as set forth in claim 10, wherein each external damper is provided at a base of the damper with a plastic attachment projection having elasticity, said slide is provided with a receiving hole of a smaller diameter than said attachment projection, and said attachment projection is made to elastically deform so that it can be inserted into said receiving hole to removably attach said external damper to said slide.

14. The magnet type rodless cylinder as set forth in claim 9, wherein each external damper is provided at a base of the damper with a plastic attachment projection having elasticity, said slide is provided with a receiving hole of a smaller diameter than said attachment projection, and said attachment projection is made to elastically deform so that it can be inserted into said receiving hole to removably attach said external damper to said slide.

* * * * *